United States Patent
Yang

(10) Patent No.: US 11,862,802 B2
(45) Date of Patent: Jan. 2, 2024

(54) LITHIUM ELECTRODE

(71) Applicants: PROLOGIUM TECHNOLOGY CO., LTD., Taoyuan (TW); Prologium Holding Inc., Grand Cayman (KY)

(72) Inventor: Szu-Nan Yang, Taoyuan (TW)

(73) Assignees: PROLOGIUM TECHNOLOGY CO., LTD., Taoyuan (TW); Prologium Holding Inc., Grand Cayman (KY)

( * ) Notice: Subject to any disclaimer, the term of this patent is extended or adjusted under 35 U.S.C. 154(b) by 0 days.

(21) Appl. No.: 17/880,122

(22) Filed: Aug. 3, 2022

(65) Prior Publication Data
US 2023/0073409 A1    Mar. 9, 2023

(30) Foreign Application Priority Data
Sep. 3, 2021    (TW) .................................. 110132793

(51) Int. Cl.
| | |
|---|---|
| *H01M 4/80* | (2006.01) |
| *H01M 4/134* | (2010.01) |
| *H01M 10/0562* | (2010.01) |
| *H01M 4/02* | (2006.01) |

(52) U.S. Cl.
CPC ............ *H01M 4/80* (2013.01); *H01M 4/134* (2013.01); *H01M 10/0562* (2013.01); *H01M 2004/021* (2013.01); *H01M 2300/008* (2013.01); *H01M 2300/0071* (2013.01)

(58) Field of Classification Search
CPC ............. H01M 4/76; H01M 4/78; H01M 4/80
See application file for complete search history.

(56) References Cited

U.S. PATENT DOCUMENTS

| | | |
|---|---|---|
| 9,034,522 B2 | 5/2015 | Lee et al. |
| 10,062,922 B2 | 8/2018 | Kumar et al. |
| 10,741,846 B2 | 8/2020 | Lee et al. |
| 10,930,972 B2 | 2/2021 | Arthur et al. |
| 2015/0111110 A1 | 4/2015 | Watanabe et al. |
| 2015/0295246 A1 | 10/2015 | Son et al. |
| 2016/0111701 A1 | 4/2016 | Schumann et al. |
| 2016/0218341 A1 | 7/2016 | Kumar et al. |

(Continued)

FOREIGN PATENT DOCUMENTS

| | | |
|---|---|---|
| CN | 111725558 A | 9/2020 |
| EP | 3819960 A1 | 5/2021 |

(Continued)

OTHER PUBLICATIONS

Extended European Search Report dated Feb. 28, 2023 in Application No. 22189884.4.

*Primary Examiner* — Stephan J Essex
(74) *Attorney, Agent, or Firm* — RABIN & BERDO, P.C.

(57) ABSTRACT

The invention discloses a lithium electrode. The electrically conductive structure layer has a recess with one-side opening, and the lithium metal layer is disposed on the bottom of the recess. The solid electrolyte layer and the electrolyte storage layer are disposed thereon sequentially. When the lithium metal is plated, the plated lithium metal is restricted by the solid electrolyte layer to push and compress the electrolyte storage layer. Therefore, the growth of the lithium dendrites is limited efficiently. The penetration through issue of the lithium dendrites will not be occurred so that the safety of the lithium metal battery is improved greatly.

11 Claims, 6 Drawing Sheets

(56) References Cited

U.S. PATENT DOCUMENTS

| | | |
|---|---|---|
| 2016/0219341 A1 | 7/2016 | Perez |
| 2016/0308243 A1 | 10/2016 | Herle et al. |
| 2016/0351956 A1* | 12/2016 | Lee .................... H01M 10/052 |
| 2017/0229731 A1 | 8/2017 | Visco et al. |
| 2017/0294678 A1 | 10/2017 | Lee et al. |
| 2017/0324097 A1 | 11/2017 | Lee et al. |
| 2018/0102522 A1 | 4/2018 | Yang |
| 2018/0102523 A1* | 4/2018 | Yang .................. H01M 10/052 |
| 2018/0342754 A1 | 11/2018 | Sakamoto et al. |
| 2019/0051925 A1 | 2/2019 | Li et al. |
| 2019/0245389 A1 | 8/2019 | Johnston et al. |
| 2020/0212491 A1 | 7/2020 | Collins et al. |
| 2021/0273233 A1* | 9/2021 | Cao ....................... H01M 4/667 |

FOREIGN PATENT DOCUMENTS

| | | |
|---|---|---|
| JP | 2013232284 A | 11/2013 |
| JP | 2016517157 A | 6/2016 |
| JP | 2021512579 A | 5/2021 |
| KR | 20150030156 A | 3/2015 |
| KR | 20180040494 A | 4/2018 |
| KR | 20180040496 A | 4/2018 |
| RU | 2684168 C1 | 4/2019 |

\* cited by examiner

LITHIUM ELECTRODE

BACKGROUND OF THE INVENTION

Cross References to Related Applications

The present application claims priority to Taiwanese Patent Application 110132793 filed in the Taiwanese Patent Office on Sep. 3, 2021, the entire contents of which is being incorporated herein by reference.

Field of Invention

The present invention is related to an electrode, in particular to a lithium electrode adapted for lithium-ion secondary batteries.

Related Art

Comparing to the current non-lithium battery system, the lithium battery system has advantages of high operation voltage (up to 3.6V), high energy density (up to 120 Wh/kg), light weight, longer cycle life, friendly to the environment and so on. According to the researching history of the lithium battery system, the earliest lithium battery developed is the rechargeable lithium metal battery which has pretty high energy density but meanwhile has serious issues of stability and safety because of the high chemical reacting ability to the electrolyte. Considering the safety issue of the lithium metal battery system, the developments of the rechargeable lithium battery gradually focus on replacing the organic solvent with the polymer electrolyte.

As for the performances of the battery system, except for the safety requirement, it is crucial to ensure that the capacity of the battery system is enough for supporting the operation duration of the device. Consequently, the capacity of the battery system becomes the important developing issue again. In the past, the development of the lithium metal battery system was suspended due to its safety issue. Comparing to the lithium-ion and the lithium polymer systems, the energy density of the lithium metal system is much higher than other systems. However, because the lithium metal has high chemical activity, an extreme oxidation-reduction reaction occurs if the lithium metal is not stored or operated under the proper condition. Practically, the lithium metal battery system is quite suitable for the current smart electrical device only if the issues of safety, processing and storage of the lithium metal can be conquered.

Therefore, how to overcome the technical bottleneck that has always existed in the lithium metal battery system has become the focus of the battery system manufacturers. For example, during the charging process, the lithium metal is not uniformly deposited on the surface of the electrode, which leads to the rapid deposition in some portions and the formation of dendritic crystals, which are called lithium dendrites. When the lithium dendrites gradually grow, they may break to form dead lithium resulting in irreversible capacity losses. More seriously, the lithium dendrites may pierce through the separator, causing internal short circuits and battery explosions. Moreover, because lithium is an extremely reactive material, it may react with the electrolyte to consume active lithium and cause potential safety issues.

Accordingly, a lithium electrode is provided to overcome the above problems.

SUMMARY OF THE INVENTION

It is an objective of this invention to provide a lithium electrode. The lithium dendrites are constrained to plate in a specific region by the arrangement of the electrically conductive structure layer and the solid electrolyte layer.

It is an objective of this invention to provide a lithium electrode. The solid electrolyte layer and the electrolyte storage layer, which is disposed above the solid electrolyte layer efficiently inhibit the height of plating of the lithium dendrite during charging due to the structural strength thereof. The lithium dendrite will mainly plate horizontally to prevent to penetrate through the electrical insulator, i.e. the separator, to avoid inner shorting. Meanwhile, the lithium dendrites are constrained to plate toward the vertical direction so that the thickness of the battery will not vary extremely.

It is another objective of this invention to provide a lithium electrode. By the arrangement of the porous covering layer, the electrolyte storage layer and the solid electrolyte layer, the lithium dendrites only can push the solid electrolyte layer toward the electrolyte storage layer during plating and stripping of the lithium dendrites. The electrolyte storage layer would be pressed or released to make the liquid or gel electrolyte impregnated therein outflow and inflow. The liquid or gel electrolyte impregnated in the electrolyte storage layer does not contact to the negative active material, the lithium metal layer, to avoid the liquid or gel electrolyte being decomposed and reduce the irreversible capacity losses.

In order to implement the abovementioned, this invention discloses a lithium electrode, which includes an electrically conductive structure layer, a lithium metal layer, a solid electrolyte layer, an electrolyte storage layer and a porous covering layer. The electrically conductive structure layer has at least one recess with one-side opening and an inner surface of the recess has at least one electrically conductive region and at least one electrically insulating region. The lithium metal layer is disposed in the recess of the electrically conductive structure layer and contacts to the electrically conductive region. The solid electrolyte layer and the electrolyte storage layer are disposed thereon sequentially. The porous covering layer is disposed on the electrically conductive structure layer to cover the opening of the recess. By this arrangement, the electrolyte storage layer impregnated with the liquid or gel electrolyte does not contact to the lithium metal layer, due to the existence of the solid electrolyte layer. Moreover, when the lithium dendrites are grown from the lithium metal layer, the lithium dendrites would be directly suppressed by the solid electrolyte layer. Also, the solid electrolyte layer is constrained by the electrolyte storage layer disposed above. Therefore, the lithium dendrites only can push the solid electrolyte layer toward and press the electrolyte storage layer. The lithium dendrites will be constrained to plate in a specific region and mainly plate horizontally. The electrical insulator, i.e. the separator, would not be penetrated through by the lithium dendrites to avoid inner shorting.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
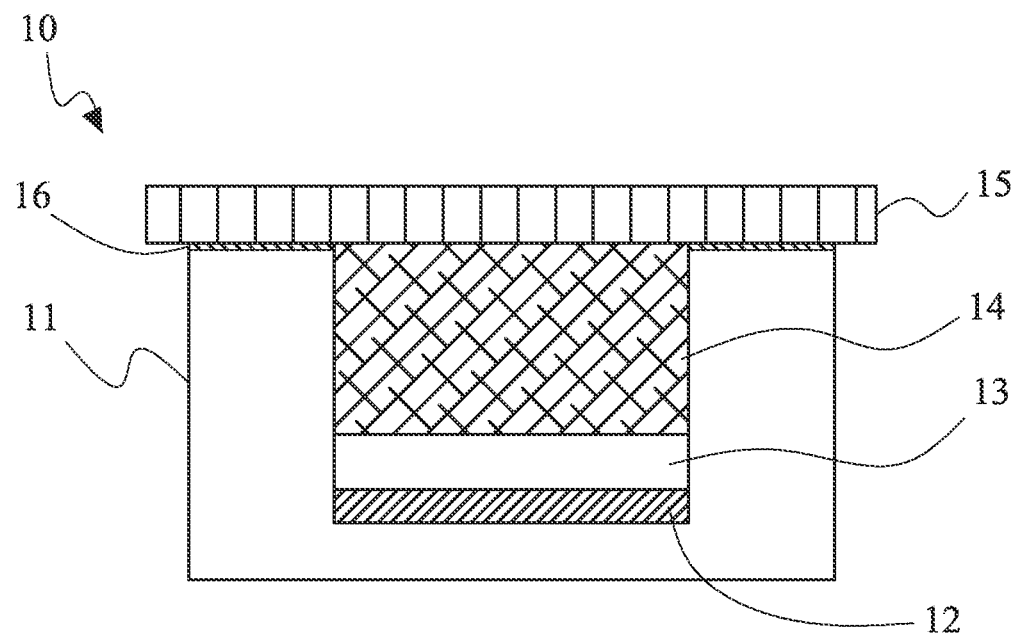
FIG. 1 is a schematic diagram of the lithium electrode of this invention.

This invention discloses a lithium electrode. Please refer to FIG. 1, which is a schematic diagram of the lithium electrode of this invention. The lithium electrode 10 of this invention includes an electrically conductive structure 11, a lithium metal layer 12, a solid electrolyte layer 13, an electrolyte storage layer 14 and a porous covering layer 15. The electrically conductive structure layer 11 has at least one recess 111 with one-side opening. Please also refer to FIG. 2, which is a schematic diagram of the electrically conductive structure layer of the lithium electrode according to FIG. 1 of this invention. The width of the opening of the recess 111 is greater than 0 or not less than 50 micrometers, preferably. The maximum available value is depended on the active range of the battery. Also, the depth of the recess 111 ranges from 15 to 40 micrometers.

The inner surface of the recess 111 has at least one electrically conductive region 113 and at least one electrically insulating region 112. The lithium metal layer 12 is disposed in the recess 111 of the electrically conductive structure layer 11 and contacts to the electrically conductive region 113. The thickness of the lithium metal layer 12 ranges from 0.3 to 5 micrometers. The solid electrolyte layer 13 is movably disposed in the recess 111 of the electrically conductive structure layer 11. The bottom of the solid electrolyte layer 13 covers and contacts to the lithium metal layer 12, and the sides of the solid electrolyte layer 13 are contacted with the electrically insulating region 112. The electrolyte storage layer 14 is disposed in the recess 111 of the electrically conductive structure layer 11. The bottom of the electrolyte storage layer 14 covers and contacts to the solid electrolyte layer 13, and the sides of the electrolyte storage layer 14 are contacted with the electrically insulating region 112. The porous covering layer 15 is disposed on the electrically conductive structure layer 11 to cover the opening of the recess 111 of the electrically conductive structure layer 11. The porous covering layer 15 has a plurality of through holes to allow lithium ions to pass. An adhesive layer 16 is disposed between the electrically conductive structure layer 11 and the porous covering layer 15 to adhere the porous covering layer 15 to the electrically conductive structure layer 11.

The liquid and/or gel electrolyte are impregnated in the electrolyte storage layer 14. The material of the solid electrolyte layer 13 may be any solid electrolyte series, such as oxide-based solid electrolyte, sulfide-based solid electrolyte, lithium-aluminum alloy solid electrolyte or lithium azide ($LiN_3$) solid electrolyte, which may be crystalline or glassy. In this invention, the lithium metal layer 12 and the electrolyte storage layer 14 are separated by the solid electrolyte layer 13. Therefore, the unnecessary contact between the liquid or gel electrolyte impregnated in the electrolyte storage layer 14 and the active material, the lithium metal layer 12 are reduced or avoided. The unnecessary consumption for the lithium ions are also reduced or avoided to prevent the performance attenuation of the lithium batteries. Hence, it is preferably that the lithium metal layer 12 is completely covered by the solid electrolyte layer 13. The side edges of the solid electrolyte layer 13 abuts against the side walls of the recess 111 to reduce or avoid the unnecessary contact between the liquid or gel electrolyte impregnated in the electrolyte storage layer 14 and the lithium metal layer 12.

The lithium metal layer 12 is disposed at the bottom of the recess 111. Therefore, the bottom of the recess 111 is the electrically conductive region 113. When the lithium electrode 10 is assembled as a battery, the electricity generated during the electrochemical reaction is outputted from the electrically conductive region 113. It is necessary that the electrically conductive region 113 is with an electrical conductive path between the inside and the outside of the battery. The solid electrolyte layer 13 and the electrolyte storage layer 14 have to contact with the electrically insulating region 112 of the recess 111. Therefore, the side walls of the recess 111 are the electrically insulating region 112.

Figure 2:
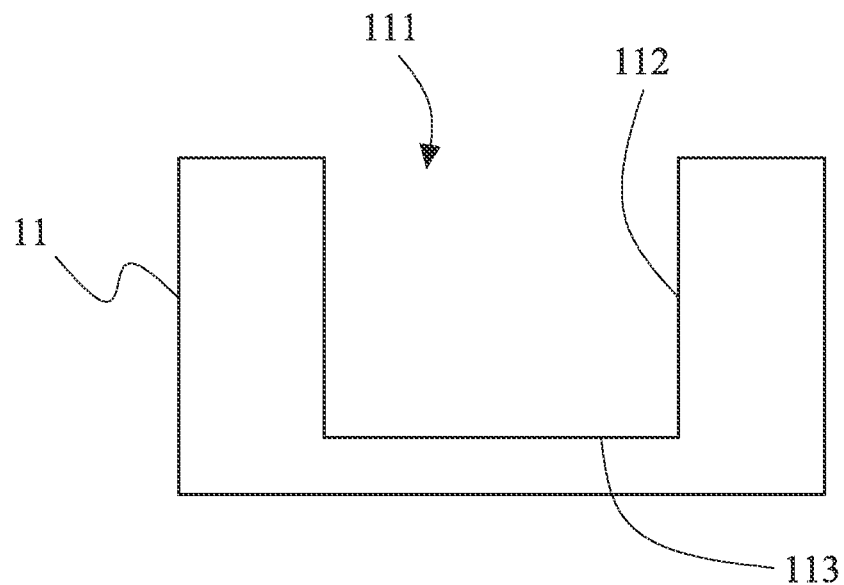
FIG. 2 is a schematic diagram of the electrically conductive structure layer of the lithium electrode according to FIG. 1 of this invention.

Moreover, the shape of the recess 111 of the electrically conductive structure layer 11 is not limited. As shown in FIG. 2, the side walls of the recess 111 is, but not limited to, vertical. Excepting for the above-mentioned requirements, it has to be considered that the solid electrolyte layer 13 is moveable to suppress the growth of the lithium dendrites, which only can push the solid electrolyte layer 13 to press the electrolyte storage layer 14. A more detailed description of the present invention is presented below. Therefore, the side walls, for arrangement of the solid electrolyte layer 13, of the recess 111 are preferably smooth and equidistant.

For the electrically conductive structure layer 11, two embodiments are provided and described in detail with respect to the drawings.

Figure 3A:
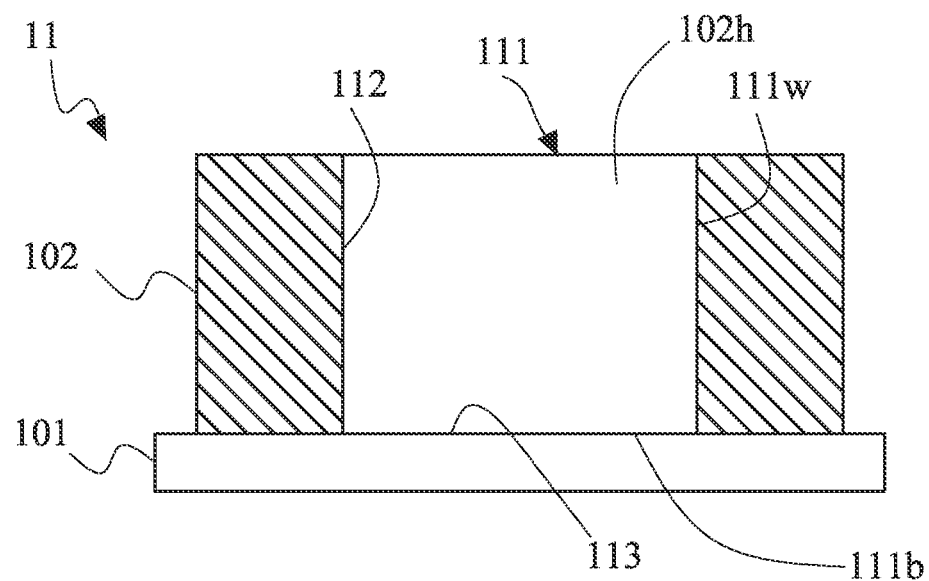
FIG. 3A is a schematic diagram of a first embodiment of the electrically conductive structure layer of the lithium electrode of this invention.
Figure 3B:
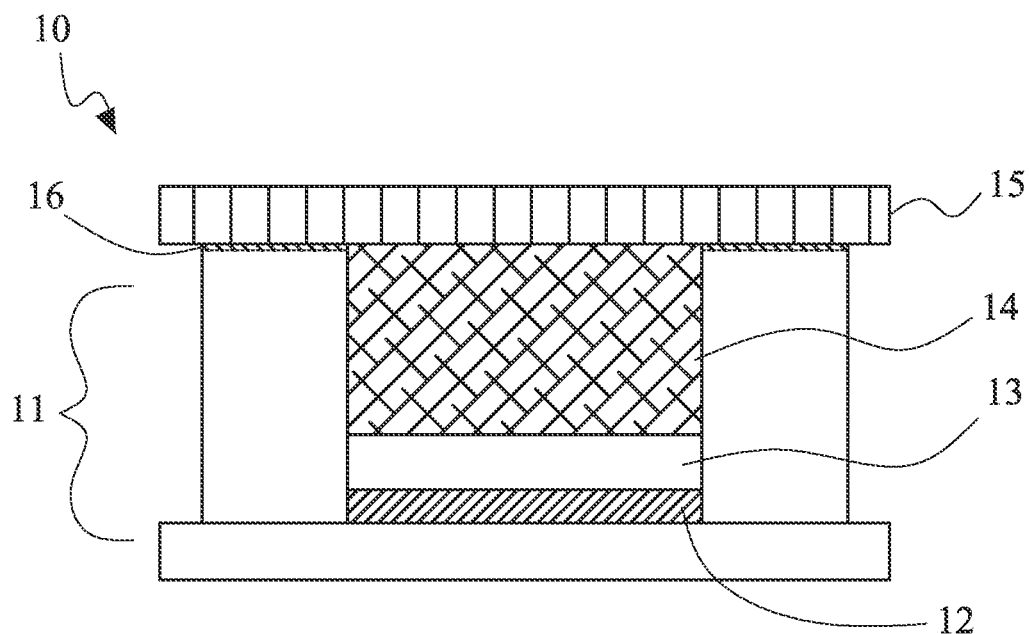
FIG. 3B is a schematic diagram of the lithium electrode based on the first embodiment of the electrically conductive structure layer shown in FIG. 3A of this invention.

Please refer to FIG. 3A, which is a schematic diagram of a first embodiment of the electrically conductive structure layer of the lithium electrode of this invention. In this embodiment, an electrically conductive element 101 is the main body of the electrically conductive structure layer 11. An electrically insulating element 102 is disposed directly on the top surface of the electrically conductive element 101. The electrically insulating element 102 has at least one through hole 102h. Parts of the electrically conductive element 101 are exposed from the through hole 102h. Therefore, the recess 111 with one-side opening is formed thereof. The bottom 111b of the recess 111 is formed by the electrically conductive element 101 to be defined as the electrically conductive region 113. The side wall 111w of the recess 111 is formed by the electrically insulating element 102 to be defined as the electrically insulating region 112. The lithium electrode 10 constructed by the electrically conductive structure layer 11 based on the first embodiment is illustrated in FIG. 3B. The bottom 111b of the recess 111 is formed by the electrically conductive element 101. Therefore, an electrical conductive path between the inside and the outside of the battery can be formed to output the electricity generated thereof. That means the electrically conductive element 101 serving the current collector of the lithium electrode 10. The material of the electrically conductive element 101 may be metal or any other electrically conductive materials, such as copper, nickel, steel or any combinations thereof.

The material of the electrically insulating element 102 may be insulating polymer material, insulating ceramic material, insulating glass material, insulating glass fiber material and any combinations thereof. The insulating polymer material includes polyimide, polyethylene terephthalate, polyurethane, polyacrylate, epoxy or silicone. The insulating glass fiber material may be FR4-class, such as FR4 epoxy glass fiber material.

Figure 4A:
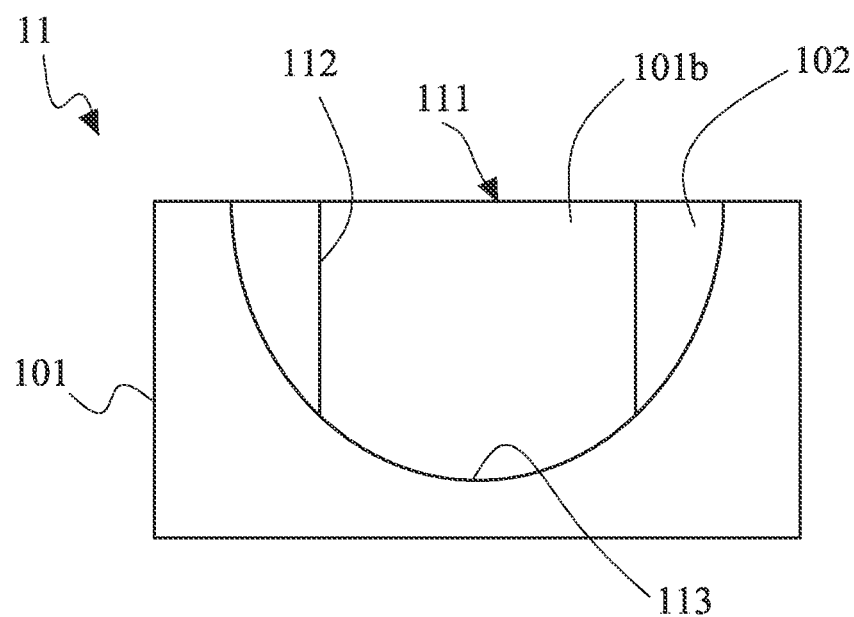
FIG. 4A is a schematic diagram of a second embodiment of the electrically conductive structure layer of the lithium electrode of this invention.
Figure 4B:
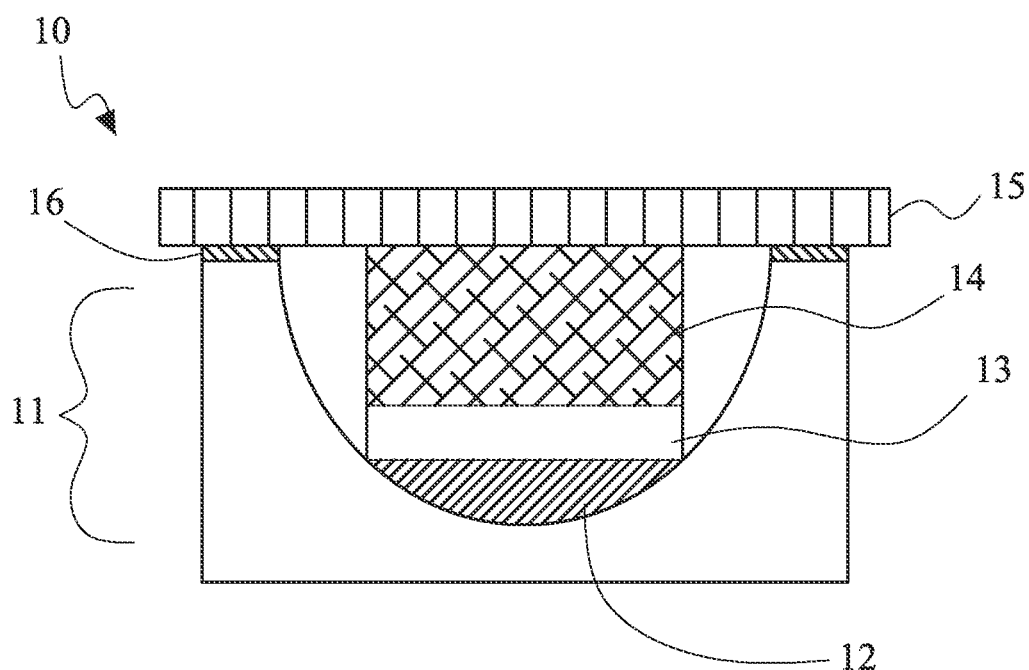
FIG. 4B is a schematic diagram of the lithium electrode based on the second embodiment of the electrically conductive structure layer shown in FIG. 4A of this invention.

Then please refer to FIGS. 4A and 4B, which is a schematic diagram of a second embodiment of the electrically conductive structure layer of the lithium electrode of this invention, and a schematic diagram of the lithium electrode based on the second embodiment of the electrically conductive structure layer shown in FIG. 4A of this invention respectively. The electrically conductive structure layer 11 of this second embodiment also includes an electrically conductive element 101 and an electrically insulating element 102. More specifically, the electrically conductive element 101 has a blind hole 101b to form the recess 111 directly. The electrically insulating element 102 is disposed on a side wall of the blind hole 101b to be defined as the electrically insulating region 112. A bottom of the blind hole 101b is uncovered by the electrically insulating element 102 and defined as the electrically conductive region 113. Similar, the electrically conductive element 101 is the main body of the electrically conductive structure layer 11. The uncovered bottom of the recess 111 is formed by the electrically conductive element 101. Therefore, an electrical conductive path between the inside and the outside of the battery can be formed to output the electricity generated by the battery constructed by lithium electrode 10. Also, the electrically conductive element 101 can be regarded as the current collector of the lithium electrode 10.

Please refer to FIGS. 1, 3B and 4B, the electrolyte storage layer 14 contacts and covers the solid electrolyte layer 13. When the electrolyte storage layer 14 is filled in the recess 111, the top surface of the electrolyte storage layer 14 is substantially aligned with the top surface of the electrically conductive structure layer 11. In other words, the remaining space is filled by the electrolyte storage layer 14. The electrolyte storage layer 14 is used to impregnate with the liquid and/or gel electrolyte. In this invention, the lithium metal layer 12 and the electrolyte storage layer 14 are separated by the solid electrolyte layer 13. Therefore, the unnecessary contact between the liquid or gel electrolyte impregnated in the electrolyte storage layer 14 and the active material (i.e. the lithium metal layer 12) are reduced or avoided. The unnecessary consumption for the lithium ions are also reduced or avoided to prevent the performance attenuation of the lithium batteries.

The electrolyte storage layer 14 is porous to impregnate with the liquid and/or gel electrolyte. The material of the electrolyte storage layer 14 may be polymer material, ceramic material, glass material, fiber material and any combinations thereof. The porous structure of the electrolyte storage layer 14 is formed by stacked particles and/or crossed fibers. The particles include ceramic particles, polymer particles and/or glass particles. The fibers include polymer fibers and/or glass fibers.

The porous covering layer 15 is adhered to the electrically conductive structure layer 11 to cover the opening of the recess 111. The porous covering layer 15 has a plurality of through holes to allow lithium ions and the electrolyte to pass for the electrochemical reactions. The through holes may be linear or non-linear (ant holes) formed by chemical or mechanical processes. Moreover, the porous covering layer 15 may be made of porous materials to offer the through holes.

Figure 5:
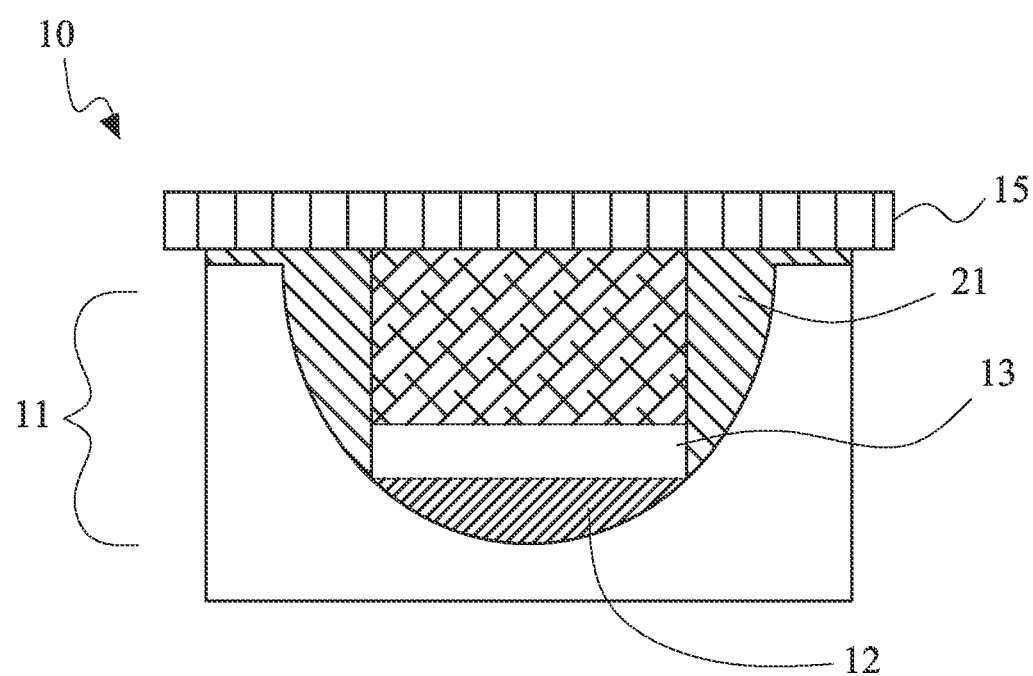
FIG. 5 is a schematic diagram of the lithium electrode of FIG. 4A of this invention, which the electrically insulating glue frame is adapted.

Further, please refer to FIG. 5, the adhesive layer 16, located between the electrically conductive structure layer 11 and the porous covering layer 15, and the electrically insulating element 102 are integrated into an electrically insulating glue frame 21. As shown in the drawing, the electrically insulating glue frame 21 is formed between the porous covering layer 15 and the electrically conductive element 101. The electrically insulating glue frame 21 located on the side walls of the recess 111 is used for the electrically insulating element 102 to define as the electrically insulating region 112. The electrically insulating glue frame 21 located between the electrically conductive structure layer 11 and the porous covering layer 15 is used to adhere the electrically conductive structure layer 11 and the porous covering layer 15. The material of the electrically insulating glue frame 21 is selected from the group consisting of thermosetting polymer, thermoplastic polymer and any combinations thereof. The thermosetting polymer is selected from the group consisting of silicone, epoxy, acrylic acid resin and any combinations thereof and the thermoplastic polymer is selected from the group consisting of polyethylene, polypropylene, thermoplastic polyimide, thermoplastic polyurethane and any combinations thereof. Due to the liquid or gel electrolyte is adapted, the material of the electrically insulating glue frame 21 is preferably selected from the electrolyte-inert material, such as silicone, polyethylene, polypropylene, thermoplastic polyimide and so on. Therefore, the electrically insulating glue frame 21 will not react with the electrolyte to maintain the adhesion ability.

Also, for the embodiment shown in FIG. 3B, the adhesive layer 16 and the electrically insulating element 102 may be integrated into an electrically insulating glue frame 21. The electrically insulating glue frame 21 is used for the electrically insulating element 102 of the recess 111 and is used to adhere the electrically conductive structure layer 11 and the porous covering layer 15. Moreover, excepting for the single-layered structure shown in the drawings, the electrically insulating glue frame 21 may be multi-layered structure. With the modification of the adhesive material, the adhesive will be better.

In general, when the lithium metal is plated, the lithium dendrites will grow vertically. With the arrangement of this invention, the growth of the lithium dendrites is constrained by the solid electrolyte layer 13. The vertical growth of the lithium dendrites will push the solid electrolyte layer 13. The solid electrolyte layer 13 is moveably disposed in the recess 111. Therefore, the solid electrolyte layer 13 is pushed to move toward the electrolyte storage layer 14. Due the porous covering layer 15 is adhered on the electrically conductive structure layer 11 firmly, the movement range of the solid electrolyte layer 13 is limited. The electrolyte storage layer 14 is porous to store the liquid and/or gel electrolyte. Also, the electrolyte storage layer 14 is compressible. When the electrolyte storage layer 14 is pressed by the solid electrolyte layer 13, the electrolyte storage layer 14 will be deformed to squeeze out parts of the liquid and/or gel electrolyte impregnated therein. Also, the compressibility of the electrolyte storage layer 14 is limited. As the compression distance increases, the resistive force to compress the electrolyte storage layer 14 will become larger to inhibit the vertical growth of the lithium dendrites. The lithium dendrites are forced to grow in a horizontal direction. The penetration through issue for the electrical insulator, i.e. the separator, caused by the lithium dendrites can be eliminated to avoid inner shorting. When the lithium metal is striped, the solid electrolyte layer 13 will move back to the original position and the electrolyte storage layer 14 will recover to the original state. The squeezed-out liquid and/or gel electrolyte will flow back to be impregnated in the electrolyte storage layer 14.

Further materials illustrations for the solid electrolyte layer 13 are described below. The sulfide-based solid electrolyte may be selected from one or more of the groups consisting of a glassy state of $Li_2S$—$P_2S_5$, a crystalline state of $Li_{x'}M_{y'}PS_{z'}$, and a glassy ceramic state of $Li_2S$—$P_2S_5$.

wherein M is selected from one or more of the groups consisting of Si, Ge, and Sn;

$$x'+4y'+5=2Z',\ 0\le y'\le 1.$$

Preferably, the glassy state of $Li_2S$—$P_2S_5$ may be selected from one or more of the groups consisting of glassy state of $70Li_2S\text{-}30P_2S_5$, glassy state of $75Li_2S\text{-}25P_2S_5$, and glassy state of $80Li_2S\text{-}20P_2S_5$. The glassy ceramic state of $Li_2S$—$P_2S_5$ may be selected from one or more of the groups consisting of glassy ceramic state of $70Li_2S\text{-}30P_2S_5$, glassy ceramic state of $75Li_2S\text{-}25P_2S_5$, and glassy ceramic state of $80Li_2S\text{-}20P_2S_5$. The crystalline state of $Li_{x'}M_{y'}PS_{z'}$ may be selected from one or more of the groups consisting of $Li_3PS_4$, $Li_4SnS_4$, $Li_4GeS_4$, $Li_{10}SnP_2S_{12}$, $Li_{10}GeP_4S_{12}$, $Li_{10}SiP_2S_{12}$, $Li_{10}GeP_2S_{12}$, $Li_7P_3S_{11}$, $L_{9.5}4Si_{1.74}P_{1.44}S_{11.7}Cl_{0.3}$, ß-$Li_3PS_4$, $Li_7P_2SI$, $Li_7P_3S_{11}$, $0.4LiI\text{-}0.6Li_4SnS_4$, and $Li_6PS_5Cl$.

The oxide-based solid electrolyte may be a fluorite structure oxide-based solid electrolyte. For example, it may be yttria stabilized zirconia (YSZ) with molar fraction 3-10%. The oxide-based solid electrolyte may be a $ABO_3$ oxide-based solid electrolyte, such as doping $LaGaO_3$. Or, the oxide-based solid electrolyte may be $Li_{1+x+4}(Al, Ga)_x(Ti, Ge)_{2-x}Si_yP_{3-y}O_{12}$ with crystalline structure, where $0\le x\le 1$ and $0\le y\le 1$. Moreover, the oxide-based solid electrolyte may be $Li_2O$—$Al_2O_3$—$SiO_2$—$P_2O_5$—$TiO_2$, $Li_2O$—$Al_2O_3$—$SiO_2$—$P_2O_5$—$TiO_2$—$GeO_2$, $Na_{3.3}Zr_{1.7}La_{0.3}Si_3PO_{12}$, $Li_{3.5}Si_{0.5}P_{0.5}O_4$, $Li_{3x}La_{2/3x}TiO_3$, $Li_7La_3Zr_2O_{12}$, $Li_{0.38}La_{0.56}Ti_{0.99}Al_{0.01}O_3$, or $Li_{0.34}LaTiO_{2.94}$.

The side walls, for arrangement of the solid electrolyte layer 13, of the recess 111 of the electrically conductive structure layer 11 are smooth and equidistant. Therefore, the solid electrolyte layer 13 will be move upward and downward smoothly during plating and striping of the lithium metal.

Figure 6A:
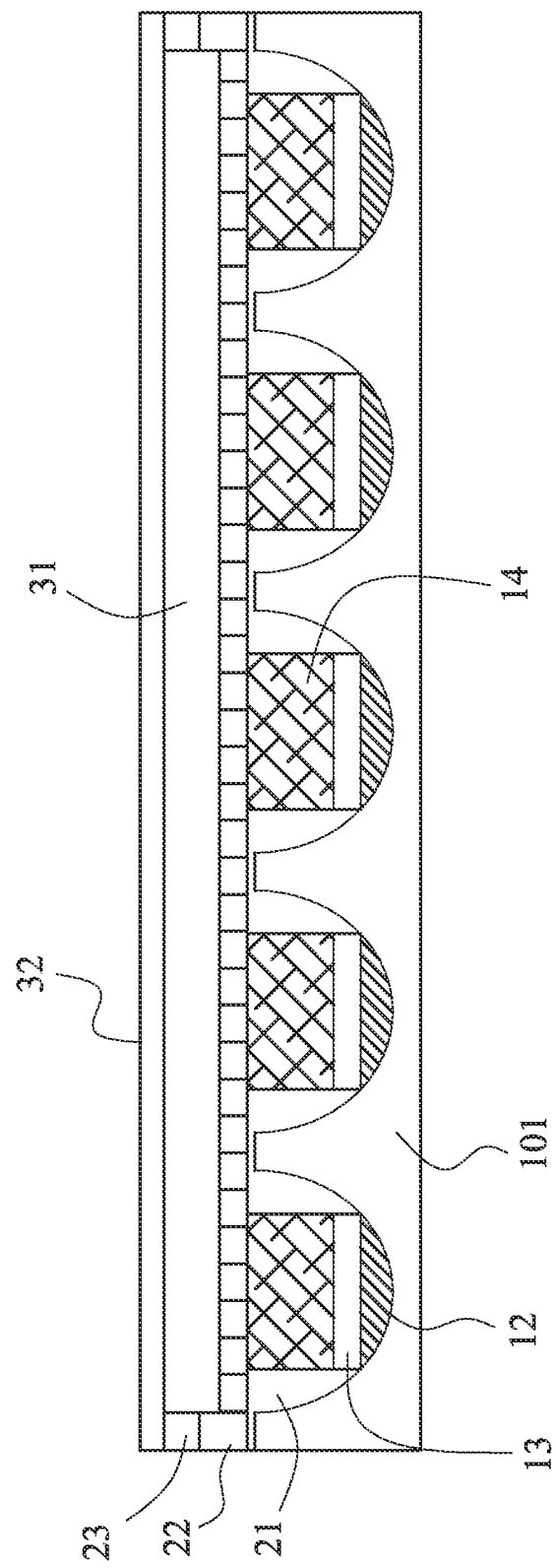
FIGS. 6A and 6B are schematic diagrams of the lithium electrode of this invention, when adapted for the battery system.

When adapting for the battery system, referring to FIG. 6A, the electrically conductive structure layer 11 of the lithium electrode 10 includes a plurality of recesses 111. The porous covering layer 15 serves as a separator. The positive active material layer 31 and the positive current collector 32 are disposed thereon sequentially. The electrically insulating glue frames 21 of the adjacent recesses 111 are connected, and the electrically insulating glue frames 21 in the side edges are adhered with the first adhesive layer 22 and the second adhesive layer 23 to the positive current collector 32 to form the package for the battery system. The materials of the first adhesive layer 22 and the second adhesive layer 23 may be the same with the material of the electrically insulating glue frames 21. Also, the recess 111 in the FIG. 6A is only illustrated as a blind hole, such as shown in FIG. 4B. However, it is not limited that the recess 111 only can be a blind hole. The electrically conductive structure layer 11, shown in FIG. 3A, or the combinations thereof can also be adapted. Further, the size, location, distance or the distribution of the recess 111 may be varied.

Figure 6B:
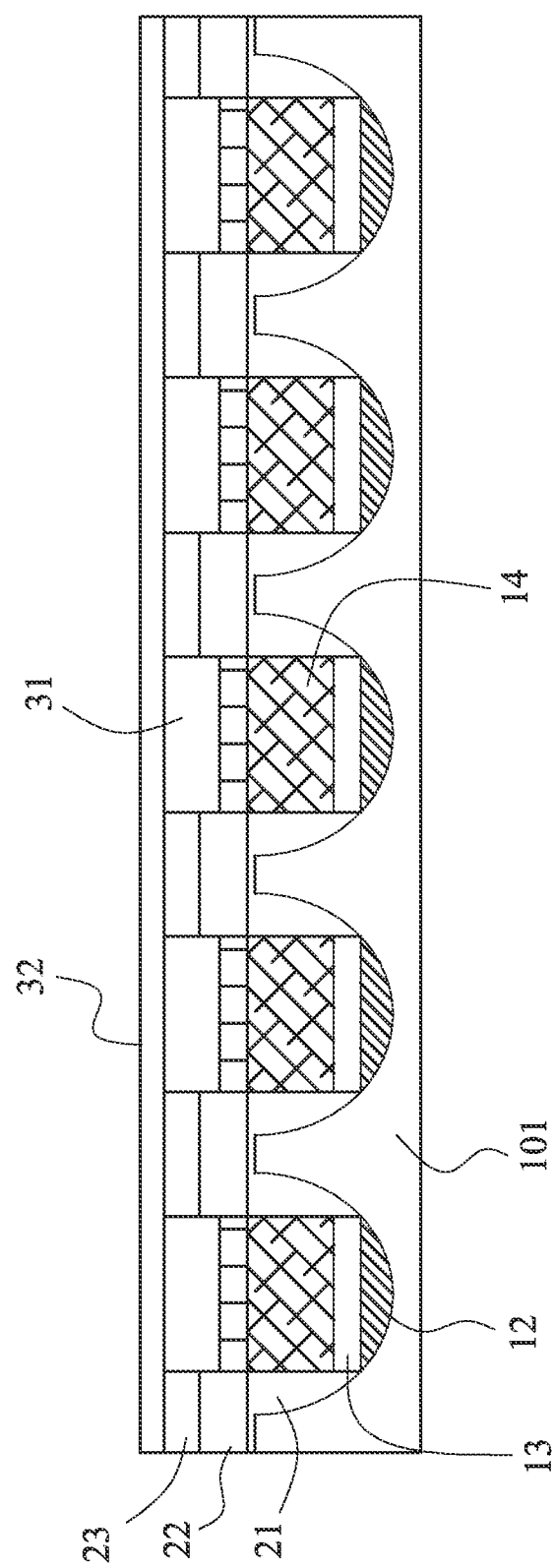

Please refer to FIG. 6B, one or more recess 111, especially located in middle portion or any locations which the adhesive is poor, may have a separate adhesive structure to improve adhesive. The separate electrically insulating glue frame 21 is also adhered with the first adhesive layer 22 and the second adhesive layer 23 to the positive current collector 32 to form the package for the battery system. As shown in FIG. 6B, all the electrically insulating glue frames 21 of the recesses 111 are separate, and the separate first adhesive layers 22 and the separate second adhesive layers 23 are adhered to the positive current collector 32 to extremely improve adhesive thereof.

Accordingly, this invention provides a lithium electrode. When the lithium metal is plated, the growth of the lithium dendrites is constrained by the solid electrolyte layer to push the solid electrolyte layer to press the electrolyte storage layer. The electrolyte storage layer will be deformed to squeeze out parts of the liquid and/or gel electrolyte impregnated therein. As the compression distance increases, the resistive force to compress the electrolyte storage layer will become larger to inhibit the vertical growth of the lithium dendrites and force the lithium dendrites to grow in a horizontal direction. The penetration through issue for the electrical insulator, i.e. the separator, caused by the lithium dendrites can be eliminated to avoid inner shorting to greatly improve the safety of the lithium batteries. When the lithium metal is striped, the solid electrolyte layer will move back to the original position and the electrolyte storage layer will recover to the original state. The squeezed-out liquid and/or gel electrolyte will flow back to be impregnated in the electrolyte storage layer. Moreover, the lithium metal layer and the liquid and/or gel electrolyte impregnated in the electrolyte storage layer are separated by the solid electrolyte layer. The liquid or gel electrolyte impregnated in the electrolyte storage layer does not contact to the negative active material, the lithium metal layer, to avoid the liquid or gel electrolyte being decomposed or degradation and reduce the irreversible capacity losses.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lithium electrode, comprising:
   an electrically conductive structure layer, having at least one recess with one-side opening and an inner surface of the recess having at least one electrically conductive region and at least one electrically insulating region;
   a lithium metal layer, disposed in the recess of the electrically conductive structure layer and contacting the electrically conductive region;
   a solid electrolyte layer, movably disposed in the recess of the electrically conductive structure layer, and covering and contacting the lithium metal layer;
   an electrolyte storage layer, disposed in the recess of the electrically conductive structure layer and covering the solid electrolyte layer, wherein the electrolyte storage layer contains a liquid or gel electrolyte; and a porous covering layer, disposed on the electrically conductive structure layer and having a plurality of through holes to allow lithium ions and the electrolyte to pass.

2. The lithium electrode according to claim 1, wherein an adhesive layer is disposed between the electrically conductive structure layer and the porous covering layer to adhere the porous covering layer to the electrically conductive structure layer.

3. The lithium electrode according to claim 1, wherein the electrically conductive structure layer comprising:

an electrically conductive element; and an electrically insulating element, having a through hole, and disposed on the electrically conductive element to form the recess, wherein a side wall of the recess is defined as the electrically insulating region and a bottom of the recess is defined as the electrically conductive region.

4. The lithium electrode according to claim 3, wherein the electrically conductive element serves as a current collector of the lithium electrode.

5. The lithium electrode according to claim 1, wherein the electrically conductive structure layer comprises:

an electrically conductive element, having at least one blind hole to form the recess; and an electrically insulating element, disposed on a side wall of the blind hole to be defined as the electrically insulating region, wherein a bottom of the blind hole is uncovered and defined as the electrically conductive region.

6. The lithium electrode according to claim 5, wherein the electrically conductive element serves as a current collector of the lithium electrode.

7. The lithium electrode according to claim 5, wherein an adhesive layer is disposed between the electrically conductive structure layer and the porous covering layer to adhere the porous covering layer to the electrically conductive structure layer, and the adhesive layer and the electrically insulating element are integrated into an electrically insulating glue frame.

8. The lithium electrode according to claim 1, wherein sides of the solid electrolyte layer and the electrolyte storage layer are contacted with the electrically insulating region.

9. The lithium electrode according to claim 1, wherein flail diameters of the through holes of the porous covering layer are not larger than 1 micrometers.

10. The lithium electrode according to claim 1, wherein a diameter of the opening of the recess is not less than 50 micrometers.

11. The lithium electrode according to claim 1, wherein a depth of the recess ranges from 15 to 40 micrometers.

* * * * *